(12) United States Patent
Reddy

(10) Patent No.: US 8,433,896 B2
(45) Date of Patent: Apr. 30, 2013

(54) SIMPLIFYING ADDITION OF WEB SERVERS WHEN AUTHENTICATION SERVER REQUIRES REGISTRATION

(75) Inventor: Balannagari Rajashekar Reddy, Pune (IN)

(73) Assignee: Oracle International Corporation, Redwood Shores, CA (US)

(*) Notice: Subject to any disclaimer, the term of this patent is extended or adjusted under 35 U.S.C. 154(b) by 660 days.

(21) Appl. No.: 12/568,695

(22) Filed: Sep. 29, 2009

(65) Prior Publication Data

US 2011/0078437 A1    Mar. 31, 2011

(51) Int. Cl.
*H04L 29/06* (2006.01)
(52) U.S. Cl.
USPC ............................................. 713/155; 726/8
(58) Field of Classification Search .................. 713/155, 713/171; 726/3, 8, 20
See application file for complete search history.

(56) References Cited

U.S. PATENT DOCUMENTS

| | | | |
|---|---|---|---|
| 5,944,824 A | 8/1999 | He | |
| 6,826,696 B1 | 11/2004 | Chawla et al. | |
| 7,137,006 B1 | 11/2006 | Grandcolas et al. | |
| 8,032,932 B2 * | 10/2011 | Speyer et al. | 726/9 |
| 2003/0028768 A1 | 2/2003 | Leon et al. | |
| 2008/0313716 A1 * | 12/2008 | Park | 726/4 |
| 2010/0042735 A1 * | 2/2010 | Blinn et al. | 709/229 |

OTHER PUBLICATIONS

"Axel Buecker et. al.", "Federated Identity Management and Web Services Security—With IBM Tivoli Security Solutions", IBM Redbooks, Publication Date: Oct. 2005, pp. 85-104.
"Axel Buecker", Table of Contents, Glossary & Index of "Federated Identity Management and Web Services Security—With IBM Tivoli Security Solutions", IBM Redbooks, Publication Date: Oct. 2005, pp. i-xiv, 455-467 & 469-478.
"IBM Tivoli Access Manager for E-Business—WebSEAL Administration Guide", Publication Date: Nov. 2003, pp. 1-70.
Table of Contents & Index of "IBM Tivoli Access Manager for E-Business—WebSEAL Administration Guide", Publication Date: Nov. 2003, pp. i-xv & 501-510.
"Rufus Credle et. al.", "IBM WebSphere Application Server V6.1 Security Handbook", IBM Redbooks, Publication Date: Dec. 2006, pp. 323-348.
"Rufus Credle et. al.", Table of Contents & Index of "IBM WebSphere Application Server V6.1 Security Handbook", IBM Redbooks, Publication Date: Dec. 2006, pp. i-xii, 545-556.
"Sun Java System Access Manager 7.1 Technical Overview", Publication Date: Mar. 2007, pp. 1-72.
Table of Contents & Index of "Sun Java System Access Manager 7.1 Technical Overview", Publication Date: Mar. 2007, pp. 1-6 & 97-101.

* cited by examiner

*Primary Examiner* — Farid Homayounmehr
*Assistant Examiner* — Suman Debnath
(74) *Attorney, Agent, or Firm* — Narendra Reddy Thappeta

(57) ABSTRACT

An aspect of the present invention simplifies addition of new server systems which serve web pages to client systems, when an authentication server requires registration before providing authentication services. In an embodiment, a backend server is provided, which is registered with an authentication server. The server systems are implemented to redirect unauthorized access requests to the backend server, and the configurations performed during registration of the backend server system are used for authenticating a user and receiving an authentication result. The backend server communicates the authentication result and other information received from the authentication server to the server system. According to another aspect, such simplification is performed in a single sign-on (SSO) environment.

19 Claims, 6 Drawing Sheets

SIMPLIFYING ADDITION OF WEB SERVERS WHEN AUTHENTICATION SERVER REQUIRES REGISTRATION

BACKGROUND

1. Technical Field

The present disclosure relates to web servers (e.g., HTTP servers) and more specifically to simplifying addition of web servers when authentication server requires registration.

2. Related Art

A web server refers to a system which serves content in the form of web pages in response to receiving corresponding requests. In a common scenario, a client system sends a request for a web page (identified by a Uniform Resource Locator (URL)) on the Internet using HTTP and a HTTP server (example of a web server) forms and sends the requested web page to the client system. The HTTP server may either retrieve static web pages or form/create the content for the web pages (e.g., by interfacing with external application servers), as is well known in the relevant arts. A version of HTTP is described in further detail in RFC2616 entitled, "Hypertext Transfer Protocol—HTTP/1.1".

Users are often required to be authenticated before a web server permits usage of applications and/or access to data, as is well known in the relevant arts. In a common approach, a user is required to provide a user identifier and a password combination, and if the provided combination is an authorized combination, the user is deemed to be authenticated. However, additional information and/or other approaches (e.g., based on biometrics) can also be used for authentication.

Authentication servers are often employed in organizations, which maintain the information required to authenticate each user, in addition to authenticating the users. For example, in the case of user identifier and password combination noted above, such combinations for various users may be maintained by the authentication server. A received combination may be compared with the maintained combinations to authenticate the user. A single authentication server may be shared by several web servers, with each web server potentially serving many users and user requests in parallel.

A web server may be required to be registered with an authentication server before the web server can be used to authenticate a user using the authentication server. Registration entails configuration of the authentication server and/or web server with appropriate information such that the web server is thereafter permitted to use the services provided by the authentication server.

One problem in such an environment is that when the enterprise expands and web servers are required to be added, each web server needs to be registered with the authentication server. The associated overhead may be unacceptable at least in some situations.

Various features of the present invention address one or more of the problems/requirements noted above.

BRIEF DESCRIPTION OF THE DRAWINGS

Example embodiments of the present invention are described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention simplifies addition of new server systems which serve web pages to client systems, when an authentication server requires registration before providing authentication services. In an embodiment, a backend server is provided, which is registered with an authentication server. The server systems are implemented to redirect unauthorized access requests to the backend server, and the configurations performed during registration of the backend server system are used for authenticating a user and receiving an authentication result. The backend server communicates the authentication result and other information received from the authentication server to the server system.

According to another aspect of the present invention, such simplification is performed in a single sign-on (SSO) environment, which controls access to several applications via a single server system.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
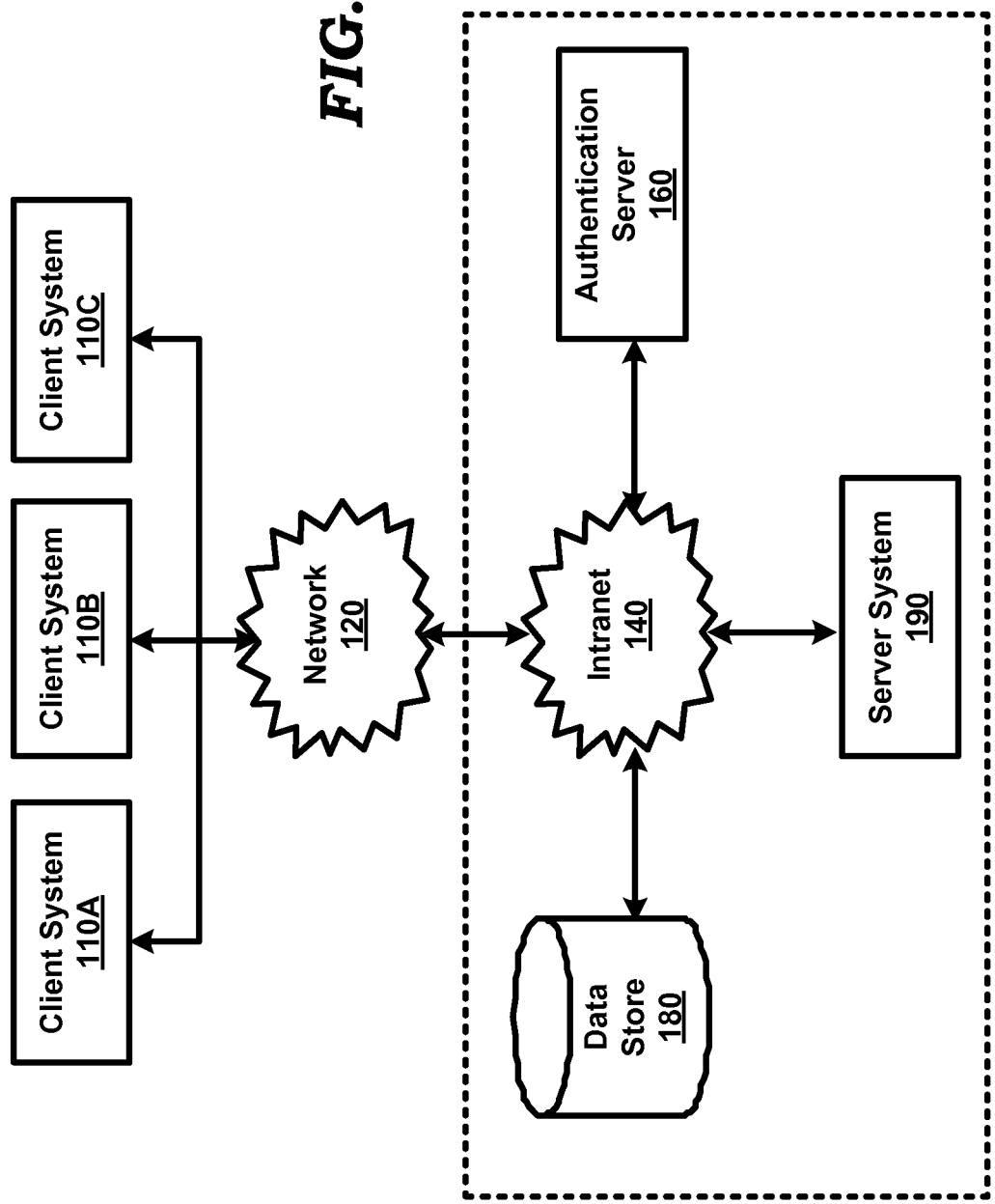
FIG. 1 is a block diagram illustrating the details of an example computing system in which several aspects of the present invention can be implemented.

FIG. 1 is a block diagram illustrating an example environment (computing system) which can be extended using several aspects of the present invention. The block diagram is shown containing client systems 110A-110C, Internet 120, intranet 140, authentication server 160, server system 190 and data store 180.

Merely for illustration, only representative number/type of systems is shown in the Figure. Many environments often contain many more systems, both in number and type, depending on the purpose for which the environment is designed. Each block of FIG. 1 is described below in further detail.

Intranet 140 represents a network providing connectivity between server system 190, data store 180, and authentication server 160, all provided within an enterprise or domain (shown with dotted boundaries). Internet 120 extends the connectivity of these (and other systems of the enterprise) with external systems such as client systems 110A-110C.

Each of intranet 140 and Internet 120 may be implemented using protocols such as Internet Protocol (IP) well known in the relevant arts. In general, in IP environments, an IP packet is used as a basic unit of transport, with the source address being set (in the originating system) to the IP address assigned to the source system from which the packet originates and the destination address set to the IP address of the target system to which the packet is to be eventually delivered. The packet is said to originate at the source system and directed to the target system.

Data store 180 represents a non-volatile storage facilitating storage and retrieval of a collection of data by authentication server 160. In one embodiment, data store 180 is implemented using relational database technologies and therefore provides storage (in non-volatile memory) and retrieval of data using structured queries such as SQL (Structured Query Language).

Each of client systems 110A-110C represents a system such as a personal computer, workstation, mobile station, etc., to access various applications provided within or external to the computing system of FIG. 1. The applications may be accessed based on HTTP requests generated by applications, such as a web browser, executing in the client system (in response to a user interaction). In response to sending requests, the client system receives a corresponding web page (or other suitable response), as implemented in the corresponding environment.

Authentication server 160 authenticates a user attempting to access an application on server system 190. Authentication server 160 maintains the user information (e.g., user identifier-password combinations) required to authenticate each user, in addition to any information related to the server systems permitted to use such authentication feature. Such details may be stored on and retrieved from data store 180.

Server system 190 controls access to various applications based on authentication of users. It should be appreciated that each server system represents a web server since the web pages are served by the server systems. The server systems, in addition, execute the applications. Alternatively, the web server and application servers may be implemented as several units.

Authentication server 160 may be used for authenticating individual users. Once authenticated, the user may access the application, for example, using HTTP based web pages. In case of Single Sign-on (SSO) systems, a single authentication permits the same user (from the same client/user system) to thereafter access multiple applications, as described below.

3. Single Sign-On (SSO)

Figure 2:
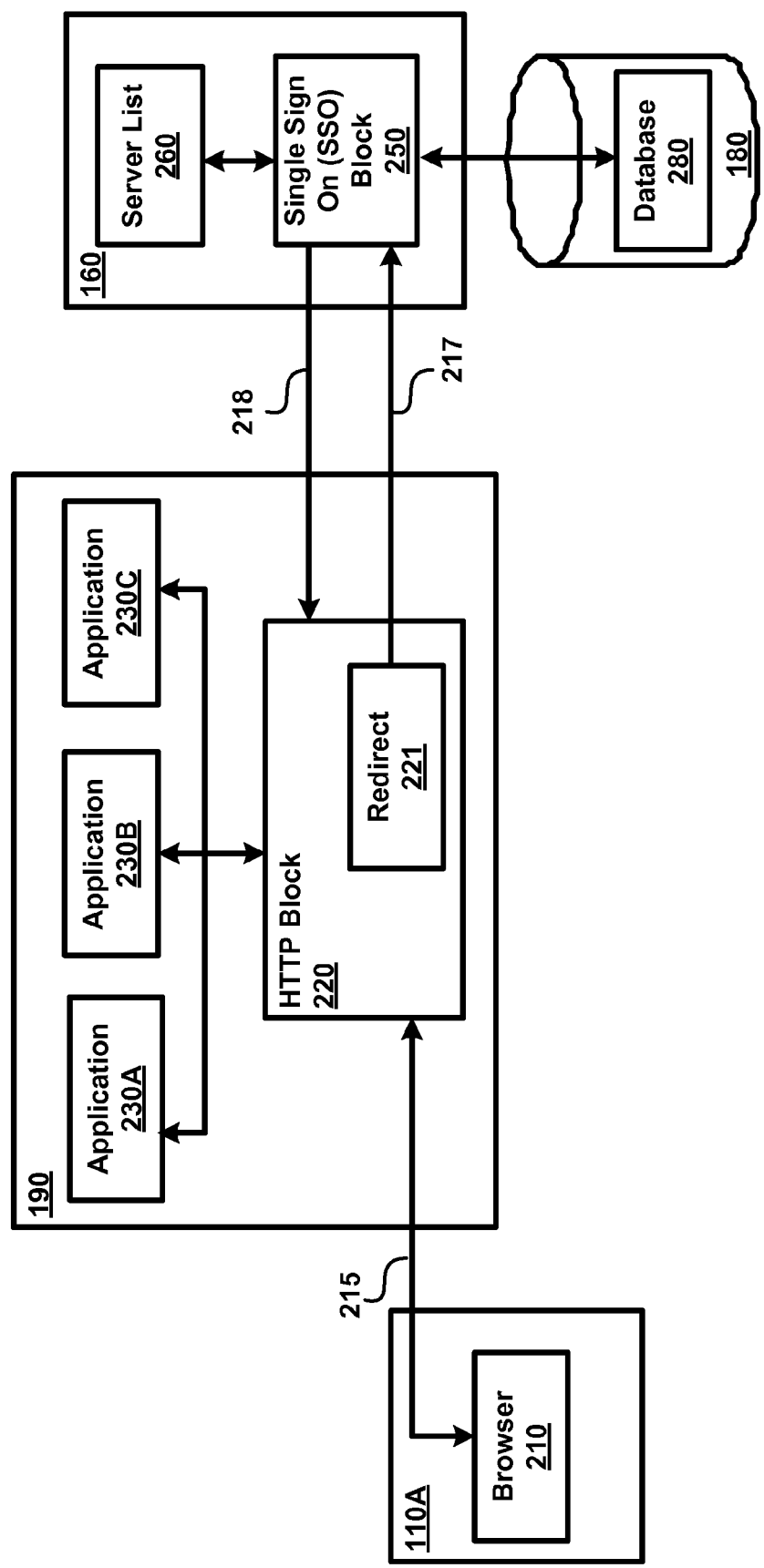
FIG. 2 is block diagram illustrating a Single Sign-on (SSO) feature in an embodiment.

FIG. 2 is a logical view of an example environment/computing system used to illustrate SSO feature. Merely for illustration, the details of SSO are described with respect to the systems of FIG. 1, and only representative number/type of systems are shown in the Figure. Many environments often contain many more systems, both in number and type, depending on the purpose for which the environment is designed.

Each user application on server system 190 provides a corresponding disparate user function accessible on the network/web. For example, a home page at google.com may allow a user to access email, manage photos, interact with others organized as social networks (Orkut), participate in various email groups (Google Groups), etc. Thus, each application should be understood to provide a broad user function, and at least some of them require authentication prior to being accessed (e.g., email requires access, while search engine may not require authentication).

Broadly, single sign-on authentication allows a user to access all or several user applications in a domain using the same authentication information (e.g., user name and password). Without single sign-on feature, the user may have to enter user name and password information for each application.

Thus, browser 210 is used by a user to access various applications provided by the domain of FIG. 2. When a user attempts to access any of the applications for the first time or upon trying to expressly logon (e.g., by clicking on a hyperlink intended for logging on), a web page is provided for receiving authentication information (e.g., user identifier and password). After the user is authenticated based on the provided information, browser 210 receives and stores locally a (user) cookie. Cookies represent information stored at user systems and made available to browsers, for purposes such as maintaining user information, session information, etc., as is well known in the relevant arts.

The cookie is sent thereafter in the header of requests to server system 190, which provides access to several/all applications in the domain irrespective of the application the user seeks to access, thereby providing the single-sign-on access to all the applications executing in the same domain (for which the cookies is authenticated).

Authentication server 160 authenticates each user ("authentication services") based on authentication information received from the users. In an embodiment, SSO block 250 receives redirects from HTTP block 220 (on path 217) when web page requests are received from unauthenticated users, and sends a web page (also specified in the redirected message) for a user at browser 210 to be able to enter user identifier and password combination. The received combination is compared with the combinations in database 280 to authenticate the user. The information in the database may further indicate various user attributes (e.g., complete user name, user specific configurations, etc.), which are also retrieved and sent along with confirmation of authentication to HTTP block 220. The confirmation message (including user attributes) may be sent in an encrypted format (requiring a decryption key at HTTP block 220) in path 218.

Server system 190 provides (or at least operates as a gateway to) a corresponding set of user applications based on web pages. The server system is shown containing corresponding application modules and a HTTP block. Each of the application blocks 230A-230C implements a corresponding user application. In general, each application block contains the program logic to operate in conjunction with HTTP block 220 and provide various application features to the user and may be implemented in a known way.

Each application is deemed to be a resource, requiring authentication prior to access. It should be appreciated that some of the applications are not 'resources' and thus do not require authentication. While the description is provided with respect to treating only the application as a resource, several features of the present invention can be implemented in conjunction with other types of resources (e.g., specific parts of an application or specific data), the access to which is controlled by web server 190 (similar to control of access to applications).

HTTP block 220 receives requests for various web pages (identified by URLs) from client system 110A and serves/sends the requested web pages to client system 110A as a response. Prior to permitting access to some of the user applications, HTTP block 220 may ensure that the user is authenticated (to access the specific resource being accessed). In case a request for web page (of a user application) is received from an unauthenticated user, the request is redirected (by redirect block 221) to authentication server 160. Redirection refers to having some other system respond to a web page request, when the request is directed to a system (here, server system 190).

The absence of authentication for a protected resource may be determined based on absence of cookie information with the request or invalid cookie (e.g., expired cookie, cookie content does not cover the resource sought to be accessed, or incorrect cookie data otherwise). Protected resources may be indicated by appropriate configurations and the applications may examine the configuration data to determine whether a resource is protected or not.

Upon successful authentication by SSO block 250, HTTP block 220 receives a confirmation message, which is decrypted using a decryption key. In an embodiment, the authentication confirmation is received in the form of a string, containing the URL of the requested resource and parameters including authentication result, and the user name, in encrypted form. Other information such as time stamp, lifetime of the authentication (validity duration), the resources/domains the authentication is valid for, etc., may also be included in the URL cookie.

HTTP block 220 then forms a user cookie, which is encrypted form of information such as the user information (based on information received from authentication server 160), the IP address of the machine for which the cookie is intended, the expiration date of the cookie (based on the lifetime received in URL cookie), time stamp representing the current time at which the cookie is created, any session identifier, authentication level (identifying the class/set of resources the user is permitted to access), etc. Thus decryption of the cookie may require a corresponding decryption key. Thus, HTTP block 220 may be designed to generate an encryption/decryption key combination and use the same for encryption/decryption of the cookie information. The reader is referred to RFC 2109 entitled, "HTTP State Management Mechanism", for further information on cookies.

Web page requests from the same user (browser 210) to access same or different applications, are thereafter received along with the cookie sent earlier. If the cookie is successfully decrypted, the request is deemed to be from an authenticated user. Accordingly, HTTP block 220 operates in conjunction with the corresponding application (determined usually based on the URL in the received request) to generate the next web page. Some of the content in the decrypted cookie may potentially be provided to the application for further use.

For the above described approach to work, registration may be required of each of the server systems before the SSO feature can be operative. The need for registration is described in further detail below with respect to an example embodiment.

4. Need for Registration

Registration is required for coordination of various operations described above. In an embodiment, when a new server system is sought to be added, a script is executed on authentication server 160. The script receives as inputs information such as an identifier (e.g., IP address or name) of the new server, and configures authentication server 160 to process authentication requests from the new server. In addition, authentication server 160 generates a configuration file, which is then stored at the new server. Various operations at the new server thereafter use the information in the configuration file, as well as the configurations caused at authentication server 160 are described below.

Figure 3:
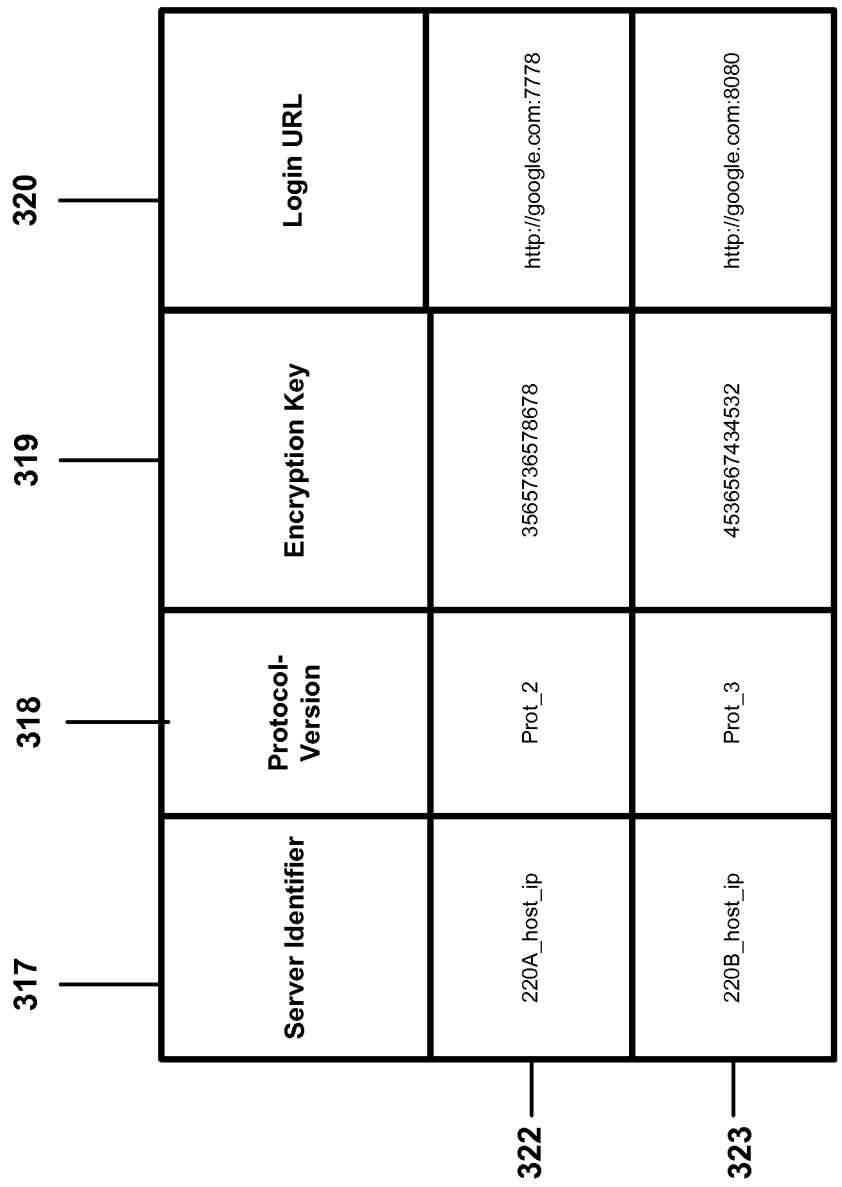
FIG. 3 depicts a table containing some of the information maintained in authentication server upon registration of server systems in an embodiment.

FIG. 3 depicts some of the configuration data (information) stored in authentication server 160. Each of the rows 322 and 323 stores information related to a corresponding one of the server systems. Row 322 may correspond to server systems 190 and row 323 may correspond to a new server system sought to be added. Columns 317, 318, 319, and 320 respectively store the unique server identifier (e.g., unique machine name), protocol version (the acceptable protocol versions to communicate with the corresponding server system), encryption key, the login URL (used to receive authentication information when authentication is requested by a server system along with information required for login, as parameters) and the location of the configuration file on the server system. It should be understood that the encryption key would be a counter-part key to the decryption key provided to the specific server system. Server list 260 (representing the information in FIG. 3) may be stored in database 280, and retrieved into the memory of authentication server 160 at least when communicating with the servers.

Thus, when authentication server 160 receives authentication request from HTTP block 220, the information in entry/row 322 is used. In particular, the server identifier, received in the site token, is used to identify the applicable row, login URL is used to identify the specific web page based on which authentication information is to be requested, the encryption key is used for encrypting the information sent to the HTTP block, and the encrypted information is communicated using the protocol version specified in column 318. The registration process entails creating an entry for the web server and also creating a configuration file for transporting (either on a network or by medium such as a tape drive, pen drive, etc.) to the new server system sought to be deployed.

The configuration file thus generated is stored on server system 190, and the stored data contains several pieces of information. For example, as noted above, paths 217 and 218 may be implemented as respective secure channels requiring encryption/decryption keys at HTTP block 220. Configuration file may thus store requisite keys to complement the implementation at authentication server 160. In addition, communication with web server 190 may be according to one of several protocols, and accordingly protocol (version) using which communication is to occur with the corresponding HTTP block is also stored in the configuration file. Thus, the specific protocol SSO block 250 is designed to communicate with, is stored in the configuration file.

The configuration file has information such as the unique identifier of server system 190 in the database 280, the IP address (or name) of authentication server 160 to perform redirects (during authentication requests), the encryption key used for encrypted communication received from authentication server 160, login URL and logout URL. The login URL is sent to authentication server 160 while passing a site token in encrypted form as a parameter to the login URL. The site token contains the original access request, the unique server identifier and any other information required consistent with the interface requirement of authentication server 160. The logout URL is sent to SSO block 250 when the user logs out of the entire application suite. SSO block 250 may clear any information maintained for the specific authenticated user for that session.

The registration requirements such as those described above may present several challenges, particularly when adding web servers. There is a general need to add server systems in enterprises, typically to serve more users and/or for faster response times. At least for reasons such as those described above, all of such newly added server systems may need to be registered with authentication server 160. The overhead associated with registration may be undesirable, at least in some environments.

Various aspects of the present invention address at least the problems/requirements noted above, as described below.

5. Simplifying Addition of New Server Systems

Figure 4:
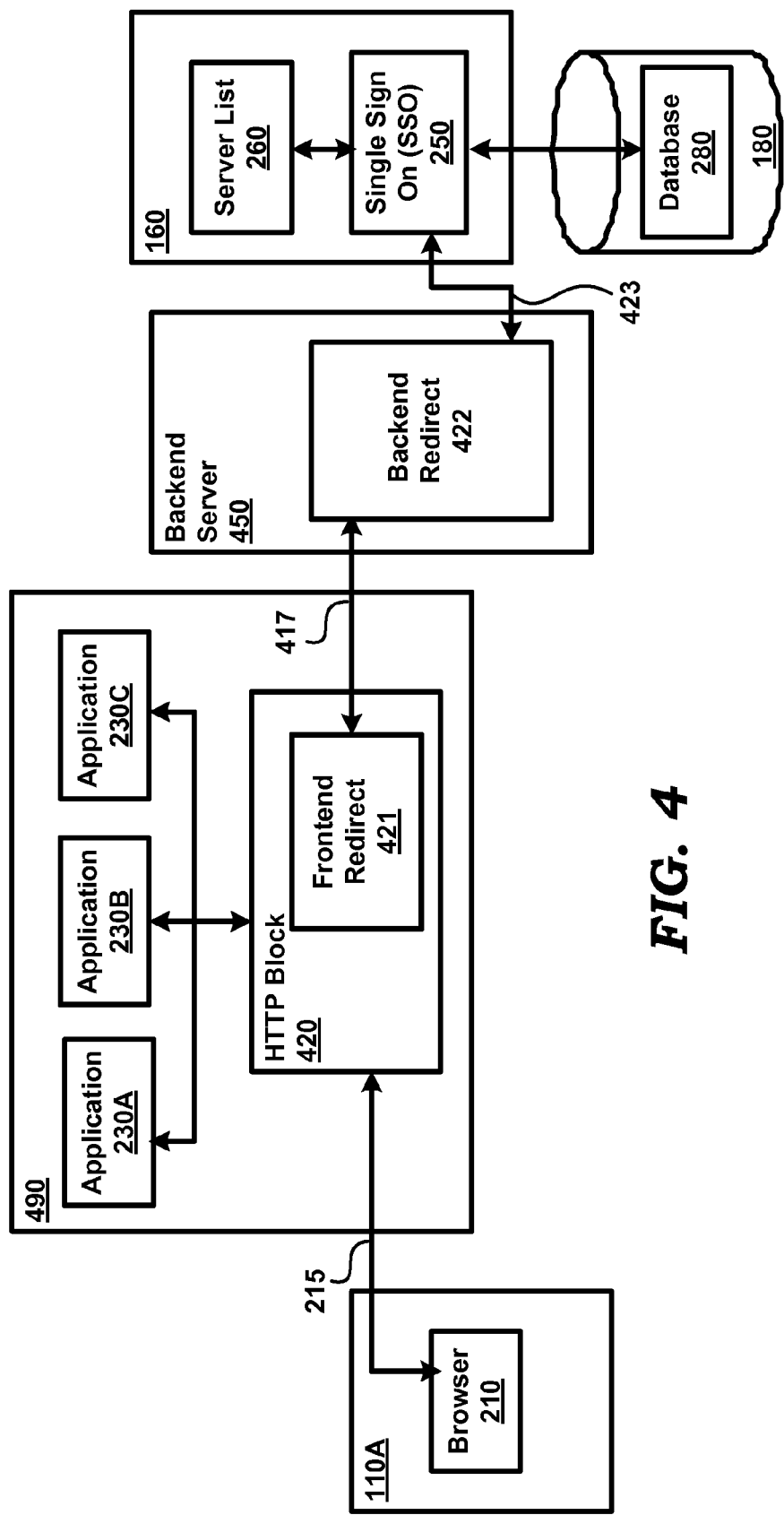
FIG. 4 is a block diagram of a computing system illustrating the manner in which addition of a new server system is simplified according to an aspect of the present invention.

FIG. 4 is a logical view of an example environment/computing system illustrating the manner in which addition of server systems is simplified according to an aspect of the present invention. As may be readily appreciated, the systems are chosen to demonstrate the manner in which the environment of FIG. 2 can be extended.

Backend server 450 is registered with authentication server 160 as described above with respect to FIGS. 2 and 3 and have stored the configuration file. In addition, backend server 450 may be designed to operate with similar interfaces (i.e., to be able to send same type of packets and receive similar responses, as described above) with authentication server 160. As described below in further detail, all the server systems (including any new ones to be deployed) may use backend server 450 for authentication, and thus need not be registered with authentication server 160. While a single instance of backend server is shown employed, it should be appreciated that alternative embodiments may be employed to contain multiple backend servers, for reasons such as redundancy, as will be apparent to one skilled in the relevant arts by reading the disclosure provided herein.

Server system 490 may operate similar to server system 190 described above, but frontend redirect block 421 may be employed (in place of redirect 221) to take advantage of backend server 450 provided according to an aspect of the present invention. The operation and implementation of frontend redirect 421 and backend redirect 422 will be clearer from the various packets exchanged between the different systems, as described below in further detail.

6. Messages Exchanged

Figure 5:
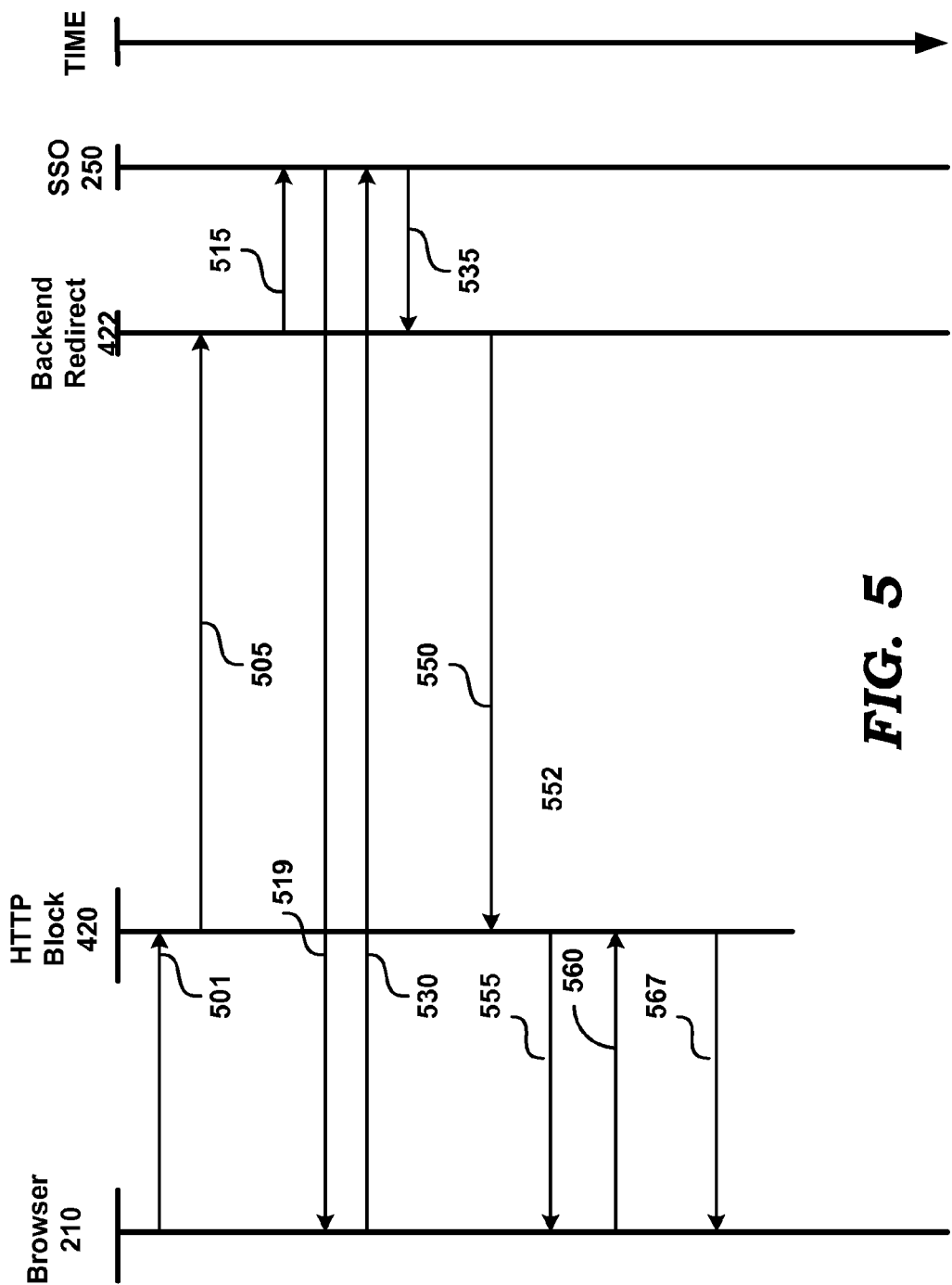
FIG. 5 is a packet flow diagram illustrating various packets between different systems in an embodiment of the present invention.

FIG. 5 shows a message sequence diagram with message flows between different logical blocks in a time based sequence in an example scenario. This sequence of messages, present a scenario of single sign-on authentication being performed in an embodiment of the present invention.

Message 501 represents an access request from browser 210 to HTTP block 420. Assuming that the user at browser 210 is not yet authenticated, message 505 represents a redirected request of the access request in message 501. Message 505 may contain the URL representing the requested resource, and the IP address/port of client system 110A from which the request originated. Message 505 may be sent to backend redirect 422 on a secure channel and the keys to provide the secure channel may be sent by backend server 450 to HTTP block 420 during connection setup (and persisted for processing several requests thereafter). HTTP block 420 may be implemented in a stateless configuration in that no state information about the redirected request need be maintained, and HTTP block 420 need not wait for a response back from backend redirect 422.

Message 515 represents an IP packet containing a login URL (determined from the configuration file) and a site token (as a parameter to the login URL) sent by backend redirect block 422 to SSO 250. The destination address of the IP packet is based on the machine address identified in the configuration file. The site token contains the initial access request (from the user) and the unique server identifier which identifies backend server 450. The URL indicates to authentication server 160 that there is an unauthenticated user who needs authentication and also the specific resource sought to be accessed. The token may be encrypted using the encryption key in the configuration file, and sent in encrypted format. In an embodiment, the encryption/decryption is performed using a single key (symmetric key approach, well known in the relevant arts).

Message 519 represents an authentication webpage sent by SSO block 250 to browser 210 for the user to enter username and password combination (or other authentication information). As noted above, the user is requested to provide authentication information on the first access to any of the resources requiring authentication in the domain (of applications served by server system 490). Message 530 (received from browser 210) contains the user name and password information, entered by the user and sent by browser 210 to SSO 250. The information is received in encrypted form for security purposes.

Message 535 represents an IP packet (having destination address equaling that of backend redirect 422) containing the user name, authentication result and the initial access request (URL cookie) sent by SSO 250 to backend redirect 422. The message may also have other details such as timestamp, lifetime of authentication, and the authentication level (specifying the class/set of resources the authentication result relates to). Message 535 is sent after authentication server 160 matches the user name and password combination sent by browser 210 to what is stored in database 280 for the user. If the received user details do not match the information in the database, message 535 is not sent to backend redirect 422. Instead, an error web page is sent back to browser 210 and the user will have to re-enter his information. The description/drawing is continued assuming that the user has been authenticated based on a valid authentication information.

Message 550 has the same content as that in message 535, but in decrypted form (decryption performed based on the key present in the configuration file) and sent from backend redirect 422 to HTTP block 420. However, any information not used by HTTP block 420 may be removed before the information is sent. It should be noted that server system 490 need not be registered with authentication server 160 due to the use of backend server 450. HTTP block 420 uses the information in message 550 and creates a user cookie for the user. The user cookie may contain the same information as that described above with respect to FIG. 2. The cookie thus sent provides for the SSO feature for the user at browser 210.

Message 555 represents a web page (also containing the user cookie) sent by HTTP block 420 to browser 210. Browser 210 stores the user cookie locally on user system 110A upon receipt of the web page. As noted above, this user cookie is sent in further access requests from browser 210 to any of the user applications, as described below with another example.

Message 560 is an access request from browser 210 to access application 230B, sent to HTTP block 420. Message 560 contains the same user cookie as that was received in message 555. HTTP block 420 decrypts the cookie. The information (authentication level or other similar information) may further indicate whether the user is permitted to access the specific resource requested to be accessed. Message 567 represents the web page requested, sent back by HTTP block 420 to browser 210.

Thus, the message sequence diagram illustrates the manner in which a Single sign-on feature is facilitated using a single authentication server and using only a single backend server registered with the authentication server. While only a single backend system is shown/described for illustration, it should be appreciated that multiple backend servers can be used for redundancy, etc., with appropriate load balancing, etc. Thus, when additional server systems are sought to be added, the newly added systems may use such backend systems (similar to the flow described above) to use any of the backend servers, without having to register with authentication server 160.

Furthermore, while the description above is provided assuming no further registration is required between HTTP block 420 and backend server 450, alternative embodiments may employ suitable registration requirements to further control the specific server systems which can seek authentication using authentication server 160.

It should be further appreciated that the features described above can be implemented in various embodiments as a desired combination of one or more of hardware, executable modules, and firmware. The description is continued with respect to an embodiment in which various features are operative when the instructions in the executable modules are executed.

7. Digital Processing System

Figure 6:
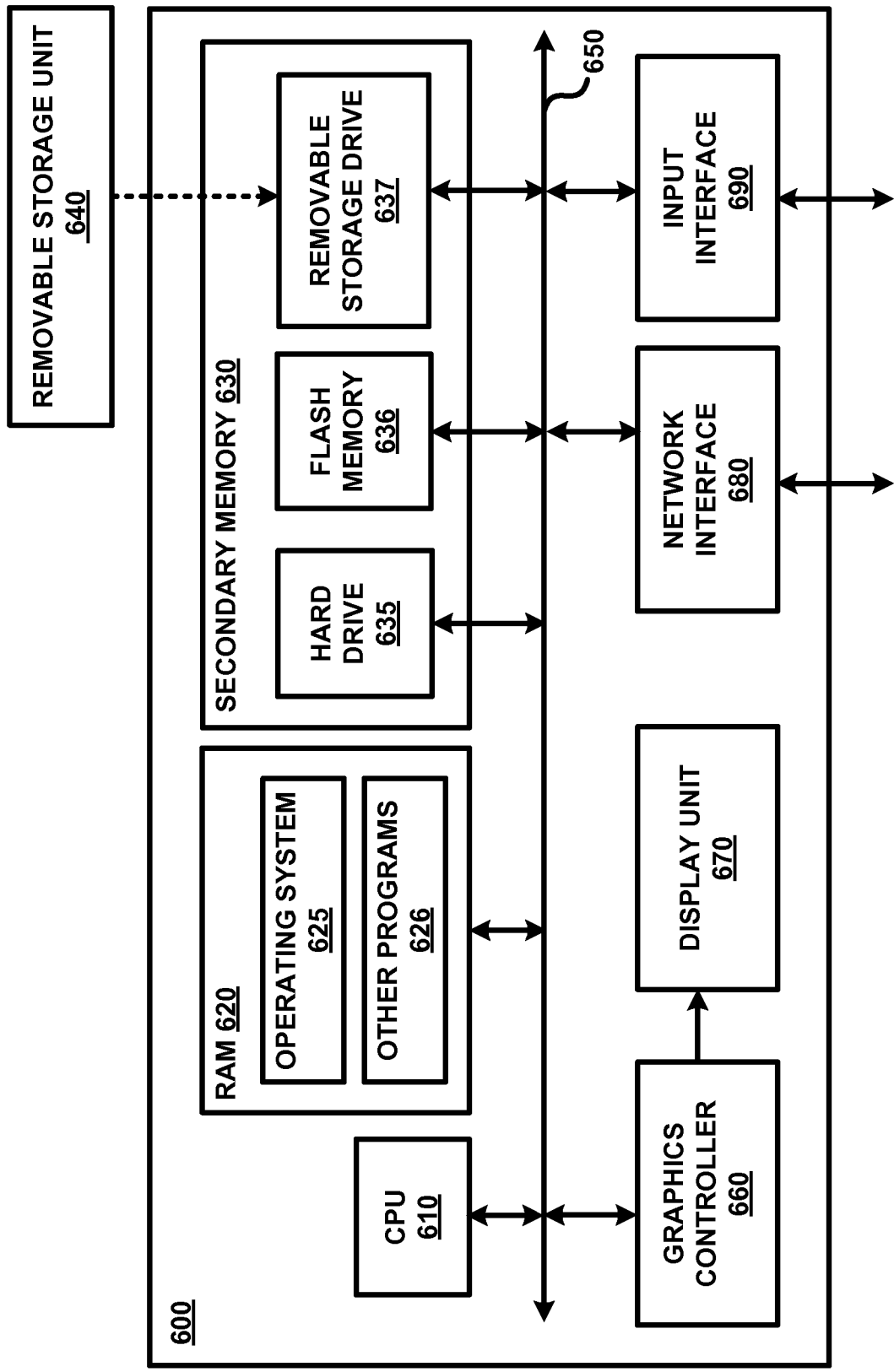
FIG. 6 is a block diagram illustrating the details of a digital processing system in which several features of the present invention are operative upon execution of instructions in an executable module.

FIG. 6 is a block diagram illustrating the details of digital processing system 600 in which several aspects of the present invention are operative by execution of appropriate software instructions. Digital processing system 600 corresponds to backend server 450 or server system 490. Digital processing system 600 may contain one or more processors (such as a central processing unit (CPU) 610), random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650. RAM 620 may further temporarily store various data.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse). Network interface 680 provides connectivity to a network (e.g., using Internet Protocol), and may be used to communicate with other connected systems (such as client system 110A and backend server 450 in case of server system 490, and server system 490 and authentication server 160 in case of backend server 450).

Secondary memory 630 may contain hard drive 635, flash memory 636, and removable storage drive 637. Secondary memory 630 may store the data and software instructions, which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computing system comprising:
    an authentication server requiring registration of respective digital processing system prior to providing authentication services to the corresponding ones of the digital processing systems, said authentication services being for authenticating unauthenticated users at respective client systems seeking to access resources in said computing system;
    a backend server registered with said authentication server, said backend server to receive a redirected request and forward said redirected request to said authentication server, said backend server to receive an authentication result from said authentication server as a response to forwarding said redirected request; and a server system to receive a request to access a resource from a user at a client system, said server system not being registered with said authentication server and said server system to redirect said request as said redirected request to said backend server if access to said resource by said user is not yet authenticated, said server system to receive said authentication result as a response to said redirect, said server system permitting said user to access said resource if said authentication result indicates that said user at said client system is authenticated without having to register said server system with said authentication server, wherein said server system and said backend server are provided as respective separate digital processing systems, wherein said authentication server contains a list of systems authorized to request authentication of users, wherein said backend server is included in said list of systems by virtue of being registered with said authentication server such that said authentication server provides authentications services to said backend server, and wherein said server system is not included in said list of systems such that said authentication server does not provide authentication services directly to said server system, thereby requiring said server system to redirect said request to said backend server for authentication services from said authentication server.

2. The computing system of claim 1, wherein said server system controls access to a plurality of resources, wherein said server system permits said user to access any of said plurality of resources if said authentication result indicates that said user at said client system is authenticated, thereby providing a single sign-on (SSO) feature, wherein the access to each of said plurality of resources is received in the form of a corresponding one of a first plurality of web pages, and a response is sent by said server system as a corresponding one of a second plurality of web pages.

3. The computing system of claim 2, wherein each of said plurality of resources is a corresponding one of a plurality of applications, the access to which is controlled by said server system.

4. The computing system of claim 3, wherein said plurality of applications comprise electronic mail (Email), social networking, managing photos, and wherein said server system permits access to at least one application without requiring authentication.

5. The computing system of claim 2, wherein said server system forms a user cookie and sends said user cookie as a response to said request if said authentication result indicates that said user is authenticated, wherein said user cookie is received with each of the accesses to any of said plurality of resources for said SSO feature.

6. The computing system of claim 5, wherein said backend server is added to said list of systems in a registration task, wherein said authentication server further generates a configuration file during said registration task, said configuration file containing a plurality of values which are required for using authentication services provided by said authentication server, said configuration file being provided to said backend server, but not to said server system.

7. The computing system of claim 6, wherein said plurality of values comprise an identifier of said authentication server, a key, a login Uniform Resource Locator (URL), and a protocol version, wherein said identification is used to determine an IP address of said authentication server to send said redirected request, wherein said key is used to establish a secure channel with said authentication server to receive said authentication result, wherein said protocol version specifies a protocol using which communication with said authentication server is to be performed.

8. The computing system of claim 7, wherein said redirected request from said server system to said backend server contains a resource identifier of said resource sought to be accessed, a source address identifying said client system, wherein said redirected request from said backend server to said authentication server contains said login URL and an encrypted parameter associated with said login URL, wherein said encrypted parameter is formed in encrypted form using said key in said plurality of values, said encrypted parameter further contains said resource identifier, said source address, an identifier of said backend server.

9. The computing system of claim 1, wherein said backend server is designed to receive requests for authentication only in the form of redirected requests via server systems, but not directly from client systems.

10. A method of simplifying addition of server systems in a computing system, wherein said computing system contains an authentication server requiring registration of requesting server before providing authentication services, said authentication services being for authenticating unauthenticated users at respective client systems seeking to access resources in said computing system, said method comprising:

maintaining a list of systems authorized to request authentication of users by said authentication server;

registering a backend server with said authentication server;

receiving, in a server system, an access request from a user to access a resource, wherein said user is not authenticated when said access request is received, and wherein said server system is not registered with said authentication server;

redirecting unauthenticated requests from said server system to said backend server, whereby said authentication server authenticates users sending said unauthenticated requests by virtue of said registering, whereby said backend server receives an authentication result from said authentication server by virtue of said registering;

forwarding said authentication result, from said backend server to said server system;

allowing, in said server system, access to said resource upon receiving said authentication result, if said authentication result indicates that said user is authenticated; and sending, from said server system, a response to said user based on processing of said request, wherein said server system and said backend server are provided as respective separate servers implemented as corresponding digital processing systems, wherein said backend server is included in said list of systems by virtue of being registered with said authentication server such that said authentication server provides authentications services to said backend server, and wherein said server system is not included in said list of systems such that said authentication server does not provide authentication services directly to said server system, thereby requiring said server system to redirect said request to said backend server for authentication services from said authentication server.

11. The method of claim 10, wherein said server system is designed to control access to a plurality of resources, said method further comprising:

allowing, in said server system, access to any of said plurality of resources to said user after receiving said authentication result if said authentication result indicates that said user is authenticated, whereby single sign on (SSO) feature is provided to said user.

12. A computing system comprising:

an authentication server requiring registration of respective digital processing system prior to providing authentication services to the corresponding ones of the digital processing systems, said authentication services being for authenticating unauthenticated users at respective client systems seeking to access resources in said computing system;

a backend server registered with said authentication server, said backend server to receive a redirected request and forward said redirected request to said authentication server, said backend server to receive an authentication result from said authentication server as a response to forwarding said redirected request;

a first server system registered with said authentication server, said first server system to receive a first request to access a first resource from a first user at a first client system, said first server system communicating directly with said authentication server for authenticating said first user if said first user is not yet authenticated, said first server system processing said first request and sending a first response to said first client system upon completion of authentication of said first user by said authentication server based on said redirected first request;

a second server system to receive a second request to access a second resource from a second user at a second client system, said second server system not being registered with said authentication server and said second server system to redirect said request as said redirected request to said backend server if access to said second resource by said second user is not yet authenticated, said second server system to receive said authentication result as a response to said redirect, said second server system permitting said second user to access said second resource if said authentication result indicates that said second user at said second client system is authenticated without having to register said second server system with said authentication server, wherein said second server system and said backend server are provided as respective separate digital processing systems such that said authentication server requires registration of the backend server for processing requests received from the backend server, and registration of the first server system before processing requests received from the first server system, wherein said authentication server contains a list of systems authorized to request authentication of users, wherein said backend server and said first server system is included in said list of systems by virtue of being registered with said authentication server such that said authentication server provides authentications services to said backend server, and said second server system is not included in said list of systems such that said authentication server does not provide authentication services directly to said second server system, thereby requiring said second server system to redirect said second request to said backend server for authentication services from said authentication server.

13. The computing system of claim 12, wherein said second server system controls access to a plurality of resources including said second resource, wherein said second server system permits said second user to access any of said plurality of resources if said authentication result indicates that said second user at said second client system is authenticated, thereby providing a single sign-on (SSO) feature, wherein the access to each of said plurality of resources is received in the form of a corresponding one of a first plurality of web pages, and a response is sent by said second server system as a corresponding one of a second plurality of web pages.

14. The computing system of claim 13, wherein each of said plurality of resources is a corresponding one of a plurality of applications, the access to which is controlled by said second server system.

15. The computing system of claim 14, wherein said plurality of applications comprise electronic mail (Email), social networking, managing photos, and wherein said second server system permits access to at least one application without requiring authentication.

16. The computing system of claim 12, wherein said second server system forms a user cookie and sends said user cookie as a response to said request if said authentication result indicates that said second user is authenticated, wherein said user cookie is received with each of the accesses to any of said plurality of resources for said SSO feature.

17. The computing system of claim 16, wherein said backend server is added to said list of systems in a registration task, wherein said authentication server further generates a configuration file during said registration task, said configuration file containing a plurality of values which are required for using authentication services provided by said authentication server, said configuration file being provided to said backend server, but not to said second server system.

18. The computing system of claim 17, wherein said plurality of values comprise an identifier of said authentication server, a key, a login Uniform Resource Locator (URL), and a protocol version, wherein said identification is used to determine an IP address of said authentication server to send said redirected request, wherein said key is used to establish a secure channel with said authentication server to receive said authentication result, wherein said protocol version specifies a protocol using which communication with said authentication server is to be performed.

19. The computing system of claim 18, wherein said redirected request from said second server system to said backend server contains a resource identifier of said resource sought to be accessed, a source address identifying said second client system, wherein said redirected request from said backend server to said authentication server contains said login URL and an encrypted parameter associated with said login URL, wherein said encrypted parameter is formed in encrypted form using said key in said plurality of values, said encrypted parameter further contains said resource identifier, said source address, an identifier of said back-end server.

* * * * *